US012810391B2

(12) United States Patent
Kanazawa et al.

(10) Patent No.: US 12,810,391 B2
(45) Date of Patent: Nov. 24, 2026

(54) CASCADED MULTI-RESOLUTION MACHINE LEARNING FOR IMAGE PROCESSING WITH IMPROVED COMPUTATIONAL EFFICIENCY

(71) Applicant: Google LLC, Mountain View, CA (US)

(72) Inventors: Noritsugu Kanazawa, Campbell, CA (US); Neal Wadhwa, Cambridge, MA (US)

(73) Assignee: GOOGLE LLC, Mountain View, CA (US)

( * ) Notice: Subject to any disclaimer, the term of this patent is extended or adjusted under 35 U.S.C. 154(b) by 211 days.

(21) Appl. No.: 18/697,686

(22) PCT Filed: Oct. 1, 2021

(86) PCT No.: PCT/US2021/053152
§ 371 (c)(1),
(2) Date: Apr. 1, 2024

(87) PCT Pub. No.: WO2023/055390
PCT Pub. Date: Apr. 6, 2023

(65) Prior Publication Data

US 2025/0232411 A1 Jul. 17, 2025

(51) Int. Cl.
*G06T 5/60* (2024.01)
*G06T 3/4046* (2024.01)
(Continued)

(52) U.S. Cl.
CPC .............. *G06T 5/60* (2024.01); *G06T 3/4046* (2013.01); *G06T 5/77* (2024.01); *G06T 7/13* (2017.01);
(Continued)

(58) Field of Classification Search
CPC ........... G06T 5/60; G06T 3/4046; G06T 5/77; G06T 7/13; G06T 2207/20081;
(Continued)

(56) References Cited

U.S. PATENT DOCUMENTS

| | | | |
|---|---|---|---|
| 10,783,611 | B2 | 9/2020 | Vemulapalli et al. |
| 10,860,919 | B2 | 12/2020 | Kanazawa et al. |

(Continued)

FOREIGN PATENT DOCUMENTS

| | | |
|---|---|---|
| JP | 2020154605 | 9/2020 |

OTHER PUBLICATIONS

Z. Yi, Q. Tang, S. Azizi, D. Jang and Z. Xu, "Contextual Residual Aggregation for Ultra High-Resolution Image Inpainting," 2020 IEEE/CVF Conference on Computer Vision and Pattern Recognition (CVPR), Seattle, WA, USA, 2020, pp. 7505-7514, doi: 10.1109/CVPR42600.2020.00753. (Year: 2020).*

(Continued)

*Primary Examiner* — Delomia L Gilliard
(74) *Attorney, Agent, or Firm* — DORITY & MANNING, P.A.

(57) ABSTRACT

Provided are systems and methods for image processing such as image modification. More particularly, example aspects of the present disclosure are directed to systems and methods for cascaded multi-resolution machine learning for performing image processing on resource-constrained devices.

20 Claims, 5 Drawing Sheets

(51) Int. Cl.
*G06T 5/77* (2024.01)
*G06T 7/13* (2017.01)

(52) U.S. Cl.
CPC ............... *G06T 2207/20081* (2013.01); *G06T 2207/20084* (2013.01); *G06T 2207/20092* (2013.01); *G06T 2207/30201* (2013.01)

(58) Field of Classification Search
CPC . G06T 2207/20084; G06T 2207/20092; G06T 2207/30201; G06V 10/764; G06V 10/774; G06V 10/82; G06V 40/16; G06N 3/0464
See application file for complete search history.

(56) References Cited

U.S. PATENT DOCUMENTS

| | | | | |
|---|---|---|---|---|
| 12,530,869 | B2 * | 1/2026 | Redden | G06V 10/764 |
| 2017/0132528 | A1 * | 5/2017 | Aslan | G06N 20/00 |
| 2020/0218961 | A1 * | 7/2020 | Kanazawa | H04Q 9/00 |
| 2020/0302576 | A1 | 9/2020 | Xu et al. | |
| 2020/0311981 | A1 | 10/2020 | Hiasa | |
| 2021/0150678 | A1 | 5/2021 | Yi et al. | |
| 2021/0173967 | A1 | 6/2021 | Yang et al. | |
| 2021/0335004 | A1 * | 10/2021 | Zohar | G06T 7/74 |
| 2021/0342984 | A1 * | 11/2021 | Lin | G06T 5/50 |
| 2022/0284613 | A1 * | 9/2022 | Yin | G06T 7/30 |
| 2022/0366544 | A1 | 11/2022 | Kudelski et al. | |
| 2023/0360181 | A1 * | 11/2023 | Kanazawa | G06N 3/0464 |
| 2024/0135509 | A1 * | 4/2024 | Liu | G06T 5/77 |
| 2024/0303788 | A1 * | 9/2024 | Kanazawa | G06T 7/194 |
| 2024/0331247 | A1 * | 10/2024 | Smith | G06T 13/80 |
| 2024/0331322 | A1 * | 10/2024 | Smith | G06T 13/40 |
| 2025/0037006 | A1 * | 1/2025 | Mahadik | G06N 20/00 |
| 2025/0054115 | A1 * | 2/2025 | Lin | G06T 7/11 |

OTHER PUBLICATIONS

Y. Sun, J. Chen, Q. Liu, B. Liu and G. Guo, “Dual-Path Attention Network for Compressed Sensing Image Reconstruction,” in IEEE Transactions on Image Processing, vol. 29, pp. 9482-9495, 2020, doi: 10.1109/TIP.2020.3023629. (Year: 2020).*

M. Zhu et al., “Image Inpainting by End-to-End Cascaded Refinement With Mask Awareness,” in IEEE Transactions on Image Processing, vol. 30, pp. 4855-4866, 2021, doi: 10.1109/TIP.2021.3076310. (Year: 2021).*

Chen et al., “TransUNet: Transformers Make Strong Encoders for Medical Image Segmentation”, arXiv:2102.04306v1, dated Feb. 8, 2021, 13 pages.

International Search Report and Written Opinion for Application No. PCT/US2021/053152, mailed Aug. 25, 2022, 21 pages.

Kim et al., “Zoom-to-Inpaint: Image Inpainting with High-Frequency Details”, arXiv:2012.09401v2, dated Jun. 29, 2022, 20 pages.

Miangoleh et al., “Boosting Monocular Depth Estimation Models to High-Resolution via Content-Adaptive Multi-Resolution Merging”, https://yaksoy.github.io/highresdepth/, retrieved on Apr. 1, 2024, 4 pages.

Mildenhall et al., “NeRF: Representing Scenes as Neural Radiance Fields for View Synthese”, arXiv:2003.08934v2, dated Aug. 3, 2020, 25 pages.

Yi et al., “Contextual Residual Aggregation for Ultra High-Resolution Image Inpainting”, Proceedings of the IEEE/CVF conference on computer vision and pattern recognition, 2020, pp. 7508-7517.

Shibata et al., “Restoration of Ocean Temperature Images by Learning based Inpainting and Optical Flow”, IEEE Internation Conference on Multimedia and Expo (ICME), Jul. 10-14, 2017, 6 pages.

International Preliminary Report on Patentability for Application No. PCT/US2021/053152, mailed Apr. 11, 2024, 14 pages.

Shin et al., “PEPSI++: Fast and Lightweight Network for Image Inpainting”, arXiv:1905.09010v5, Mar. 6, 2020, 14 pages.

Yu et al., “Generative Image Inpainting with Contextual Attention”, arXiv:1801.07892v2, Mar. 21, 2018, 15 pages.

* cited by examiner

CASCADED MULTI-RESOLUTION MACHINE LEARNING FOR IMAGE PROCESSING WITH IMPROVED COMPUTATIONAL EFFICIENCY

PRIORITY CLAIM

This application is based upon and claims the right of priority under 35 U.S.C. § 371 to International Application No. PCT/US2021/053152 filed on Oct. 1, 2021. Applicant claims priority to and the benefit of each of such applications and incorporates all such applications herein by reference in their entirety.

FIELD

The present disclosure relates generally to image processing such as image modification. More particularly, the present disclosure relates to systems and methods for cascaded multi-resolution machine learning for image processing with improved computational efficiency.

BACKGROUND

Image processing can include the modification of digital imagery to have an altered appearance. Example image modifications include smoothing, blurring, deblurring, and/or many other operations. Some image modifications include generative modification in which new image data is generated and inserted into the imagery as a replacement for the original image data. Some example generative modifications can be referred to as “inpainting”.

Image processing can also include the analysis of imagery to identify or determine characteristics of the imagery. For example, image processing can include techniques such as semantic segmentation, object detection, object recognition, edge detection, human keypoint estimation, and or various other image analysis algorithms or tasks.

One major challenge associated with the use of machine learning models for image processing is the restriction of the input and output image resolutions. In particular, the higher the resolution is, the more the memory usage and the latency increase. Thus, running a machine learning model to perform image processing on an image of any significant size consumes an significant amount of computational resources such as memory usage, processor usage, etc. This makes the use of machine learning models at high resolutions significantly challenging or even infeasible in certain resource-constrained environments such as “on-device” on a computing device (e.g., smartphone) with few or limited computational resources. As an example, the standard resolution of typical machine learning models may be in the range of 512×512, which is already very high to run on smartphones.

One solution to the computational challenge described above is to run machine learning models on imagery having a lower resolution. This can conserve or reduce the amount of resources consumed. However, processing images in lower resolutions degrades the quality of the processing output and therefore has its own drawbacks.

SUMMARY

Aspects and advantages of embodiments of the present disclosure will be set forth in part in the following description, or can be learned from the description, or can be learned through practice of the embodiments.

One example aspect of the present disclosure is directed to a computing system for image modification with improved computational efficiency, the computing system including: one or more processors: and one or more non-transitory computer-readable media that collectively store instructions that, when executed by the one or more processors, cause the computing system to perform operations. The operations include obtaining a lower resolution version of an input image, wherein the lower resolution version of the input image has a first resolution, wherein the lower resolution version of the input image comprises one or more image elements to be modified with predicted image data. The operations include processing the lower resolution version of the input image with a first machine-learned model to generate an augmented image having the first resolution, wherein the augmented image comprises first predicted image data replacing the one or more image elements. The operations include extracting a portion of the augmented image, wherein the portion of the augmented image comprises the first predicted image data. The operations include upscaling the extracted portion of the augmented image to generate an upscaled image portion having an upscaled resolution. The operations include processing the upscaled image portion with a second machine-learned model to generate a refined portion, wherein the refined portion comprises second predicted image data that modifies at least a portion of the first predicted image data. The operations include generating an output image based on the refined portion and a higher resolution version of the input image, wherein both the output image and the higher resolution version of the input image have a second resolution that is greater than the first resolution. The operations include providing the output image as an output.

Another example aspect of the present disclosure is directed to a computer-implemented method for training machine learning models to perform image modification. The method includes receiving, by a computing system comprising one or more processors, a lower resolution version of an input image and a ground truth image, wherein the lower resolution version of the input image has a first resolution and the ground truth image has a second resolution that is greater than the first resolution, and wherein the lower resolution version of the input image comprises one or more image elements not present in the ground truth image. The method includes processing, by the computing system, the lower resolution version of the input image with a first machine-learned model to generate a lower resolution version of an augmented image having the first resolution, wherein the lower resolution version of the augmented image comprises first predicted data replacing the one or more image elements. The method includes upscaling, by the computing system, the lower resolution version of the augmented image to generate a higher resolution version of the augmented image having the second resolution. The method includes processing, by the computing system, at least a portion of the higher resolution version of the augmented image with a second machine-learned model to generate a predicted image having the second resolution. The method includes evaluating, by the computing system, a loss function that evaluates a difference between the predicted image and the ground truth image. The method includes adjusting one or more parameters of at least one of the first machine-learned model or the second machine-learned model based at least in part on the loss function.

Another example aspect of the present disclosure is directed to one or more non-transitory computer readable media that collectively store instructions that, when executed by one or more processors, cause a computing system to perform operations. The operations include obtaining a lower resolution version of an input image, wherein the lower resolution version of the input image has a first resolution. The operations include processing the lower resolution version of the input image with a first machine-learned model to generate a first predicted image having the first resolution, wherein the first predicted image comprises first predicted image data. The operations include extracting a portion of the first predicted image, wherein the portion of the first predicted image comprises the first predicted image data. The operations include upscaling the extracted portion of the first predicted image to generate an upscaled image portion having an upscaled resolution. The operations include processing the upscaled image portion with a second machine-learned model to generate a second predicted image, wherein the second predicted image comprises second predicted image data that modifies at least a portion of the first predicted image data.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

Figure 1:
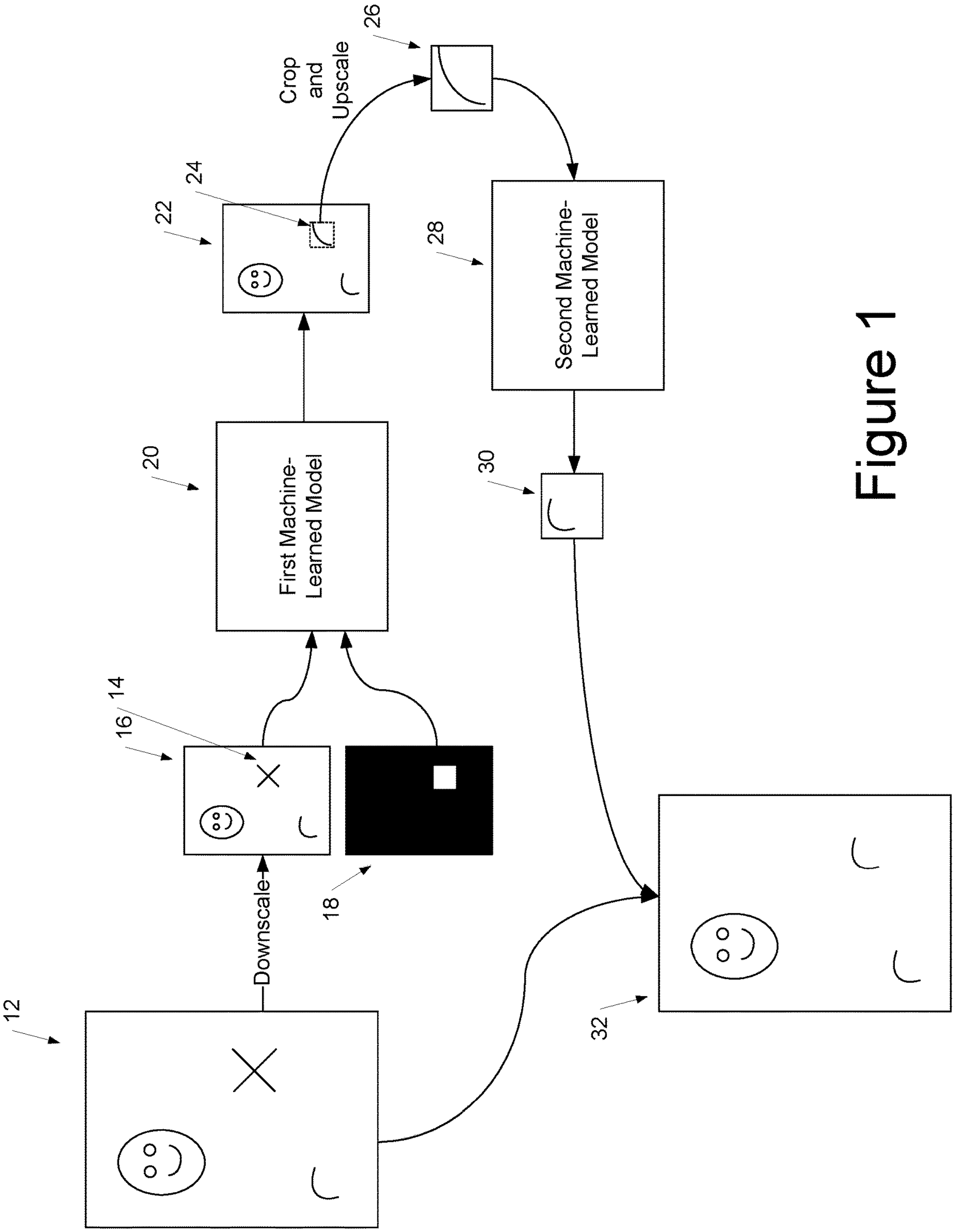
FIG. 1 depicts a block diagram of an example technique for using cascaded multi-resolution machine learning for image processing (e.g., inpainting) according to example embodiments of the present disclosure.

Reference numerals that are repeated across plural figures are intended to identify the same features in various implementations.

DETAILED DESCRIPTION

Overview

Generally, the present disclosure is directed to systems and methods for image processing such as image modification. More particularly, example aspects of the present disclosure are directed to systems and methods for cascaded multi-resolution machine learning for performing image processing on resource-constrained devices.

In one example approach, an image processing system includes two machine learning components. In particular, a first machine learning model can perform image processing (e.g., image modification such as inpainting) on an entire input image in a lower resolution. The second machine learning model can perform image processing (e.g., image modification such as inpainting) on only one or more selected subsets ("crops") of the output of the first model which have been upscaled to a higher resolution.

In such fashion, the first model can leverage contextual and/or semantic information contained throughout the entire image to perform an initial attempt at the image processing task. However, because the first model operates in the lower resolution, the computational expenditure of the first model can be relatively low.

Next, the second model can perform more detailed, higher quality image processing on the selected subset(s) of the output of the first model. Specifically, because the second model operates in the higher resolution, the output of the second model will generally be higher quality and/or more detailed relative to the output of the first model. However, because the second model operates on only selected subset(s), the computational expenditure of the second model can be held to a lower, reduced level (e.g., as compared to running the second model on the entirety of the input at the higher resolution).

In some implementations, the output of the second model can be used on its own. In other implementations, the output of the second model can be combined with an original higher resolution input to produce a complete higher resolution output. In other implementations, the output of the second model can be combined with an upscaled version of the output of the first model to generate a complete higher resolution output.

In some implementations, both the first and the second model are jointly trained. For example, a loss can be determined based on the output of the second model. The loss can be backpropagated through the second model and then through the first model to train the second model and/or the first model.

The systems and methods of the present disclosure provide a number of technical effects and benefits. As one example technical effect, the systems and methods of the present disclosure provide an improved tradeoff between image processing quality and computational resource usage. For example, as compared to systems that perform image processing on only a high resolution crop of an input image, the proposed systems can provide improved quality. This is because in many cases, high quality image processing requires access to the semantic information from the entire image, rather than just the information contained within a smaller crop. Thus, by processing a lower resolution version of the entire image with the first model prior to processing the higher resolution version of the crop with the second model, the proposed system can have access to the semantic information contained throughout the image, rather than just the cropped portion, all while maintaining acceptable levels of computational resource usage. Likewise, as compared to systems that process the entire input image in the higher resolution (which may not be possible or desirable in certain computing environments), the proposed systems can provide a savings of computational resources such as processor usage, memory usage, etc. Thus, high quality image processing results can be obtained even in computing resource-constrained computing environments.

In one example, the systems described herein can be implemented as part of or in cooperation with a camera application. For example, a camera can capture an image and the systems and methods described herein can be used to process (e.g., modify) the image as part of or as a service for the camera application. This can enable users to process (e.g., modify such as remove unwanted objects from) the images they capture or upload or otherwise provide as input.

With reference now to the Figures, example embodiments of the present disclosure will be discussed in further detail.

Example Image Processing Flow

FIG. 1 shows an example flow for performing image modification with improved computational efficiency. As a particular example, the image modification task may be inpainting, in which a selected (e.g. user selected) element of an input image is “filled in” based on information from the surrounding area of the input image. This may for instance be used to enhance images, e.g. by “filling in” selected blemishes, flaws etc. Although FIG. 1 provides the example flow in the context of an example image processing task of image modification (e.g., inpainting), the disclosed technology can be applied to other image processing tasks.

As shown in FIG. 1, a computing system can obtain a lower resolution version 16 of an input image. The lower resolution version 16 of the input image can have a first resolution. The lower resolution version 16 of the input image can include one or more image elements to be modified with predicted image data. As an example, in FIG. 1, the lower resolution version 16 of the input image includes an undesirable image element 14 and the system seeks to replace the image element 14 via inpainting.

In some implementations, the computing system can obtain the lower resolution version 16 of the input image by downscaling a higher resolution version 12 of the input image. For example, the higher resolution version 12 of the input image can be the original version of the input image that is obtained from an imaging pipeline of a camera system, uploaded or selected by a user, and/or obtained via various other avenues by which an input image may be subjected to the illustrated process.

Referring still to FIG. 1, the computing system can process the lower resolution version 16 of the input image with a first machine-learned model 20 to generate an augmented image 22 having the first resolution. The augmented image can include first predicted image data that modifies the one or more image elements 14.

The first machine-learned model 20 can be various forms of machine-learned models such as neural networks. In one example, the first machine-learned model 20 can be a convolutional neural network. In one example, the first machine-learned model 20 can be a transformer model that uses self-attention. In one example, the first machine-learned model 20 can have an encoder-decoder architecture.

In some implementations, the first machine-learned model 20 can perform an image modification task such as, for example, inpainting, deblurring, recoloring, or smoothing of the one or more image elements 14.

Thus, in some implementations, as shown in FIG. 1, processing the lower resolution version 16 of the input image with the first machine-learned model 20 to generate the augmented image 22 can include processing the lower resolution version 16 of the input image and a mask 18 that identifies the one or more image elements 14 with a first machine-learned inpainting model to generate the augmented image 22 having first inpainted image data that modifies the one or more image elements.

In some implementations, the one or more image elements 14 to be replaced can include one or more user-designated image elements that have been designated based on one or more user inputs (e.g., inputs to a graphical user interface). Alternatively or additionally, the one or more image elements 14 to be replaced can include one or more computer-designated image elements. For example, the one or more computer-designated image elements can be computer-designated by processing the input image with one or more classification sub-blocks of at least one of the first machine-learned model 20 or the second machine-learned model 28.

In other implementations, image analysis tasks can be performed in addition to or alternatively from the example image modification task illustrated in FIG. 1. As examples, in some implementations, the output of the first machine-learned model can be a first predicted image that includes predicted data such as semantic segmentation data, object detection data, objection recognition data, facial recognition data, human keypoint detection data, edge detection data, and/or other predicted data.

Referring still to FIG. 1, the computing system can extract a portion 24 of the augmented image 22. The extracted portion may comprise an image region corresponding to the one or more image elements 14, and may therefore be a region designated by one or more user inputs and/or by the mask 18. The portion 24 of the augmented image can include the first predicted image data that modified the one or more image elements 14.

The computing system can upscale the extracted portion 24 of the augmented image 22 to generate an upscaled image portion 26 having an upscaled resolution. Upscaling can include upsampling and/or other forms of increasing the resolution of the extracted portion 24.

The computing system can process the upscaled image portion 26 with a second machine-learned model 28 to generate a refined portion 30. The refined portion 30 can include second predicted image data that modifies at least a portion of the first predicted image data.

The second machine-learned model 20 can be various forms of machine-learned models such as neural networks. In one example, the second machine-learned model 20 can be a convolutional neural network. In one example, the second machine-learned model 20 can be a transformer model that uses self-attention. In one example, the second machine-learned model 20 can have an encoder-decoder architecture.

In some implementations, as shown in FIG. 1, processing the upscaled image portion 26 with the second machine-learned model 28 to generate the refined portion 30 can include processing the upscaled image portion 26 with a second machine-learned inpainting model to generate the refined portion 30 having second inpainted image data that modifies at least a portion of the first inpainted image data.

However, in other implementations, image analysis tasks can be performed in addition to or alternatively from the example image modification task illustrated in FIG. 1. As examples, in some implementations, the output of the second machine-learned model can be a second predicted image that includes predicted data (e.g., refined predicted data) such as semantic segmentation data, object detection data, objection recognition data, facial recognition data, human keypoint detection data, edge detection data, and/or other predicted data.

Referring still to FIG. 1, the computing system can generate an output image 32 based on the refined portion 30 and the higher resolution version 12 of the input image. In some implementations, both the output image 32 and the higher resolution version 12 of the input image have a second resolution that is greater than the first resolution.

In some implementations, generating the output image 32 based on the refined portion 30 and the higher resolution version 12 of the input image can include inserting the refined portion 30 into the higher resolution version 12 of the input image (e.g., at a corresponding location).

In some implementations, upscaling the extracted portion 24 of the augmented image 22 to generate the upscaled image portion 26 having the upscaled resolution can include upscaling the extracted portion 24 of the augmented image 22 such that the upscaled resolution matches a corresponding resolution of a corresponding portion of the higher resolution version 12 of the input image, where the corresponding portion proportionally corresponds to the extracted portion 24 of the augmented image. In such fashion, the refined portion 30 can be inserted back into the higher resolution version 12 of the input image with the appropriate size/resolution.

The computing system can provide the output image 32 as an output. For example, providing an image as an output can include storing the image in a memory, transmitting the image to an additional device, and/or displaying the image.

In some implementations, the input image can include multiple image elements to be modified, replaced, etc. In some of such implementations, the computing system can process the lower resolution version 16 of the input image with the first machine-learned model only once to generate one output for the entire image. Thereafter, the computing system can perform the extracting, upscaling, and processing of the upscaled image portion with the second machine-learned model 28 separately for each object of the multiple different objects. In such fashion, multiple object crops can be refined in parallel, reducing latency.

In some implementations, the computing system can pass one or more internal feature vectors from the first machine-learned model 20 to the second machine-learned model 28. Thus, latent space information can be shared between the models.

In some implementations, the augmented image and/or other model output(s) can further include a predicted depth channel (e.g., depth data can also be output by the first machine-learned model 20 and/or second machine-learned model 28).

Example Training Flow

Figure 2:
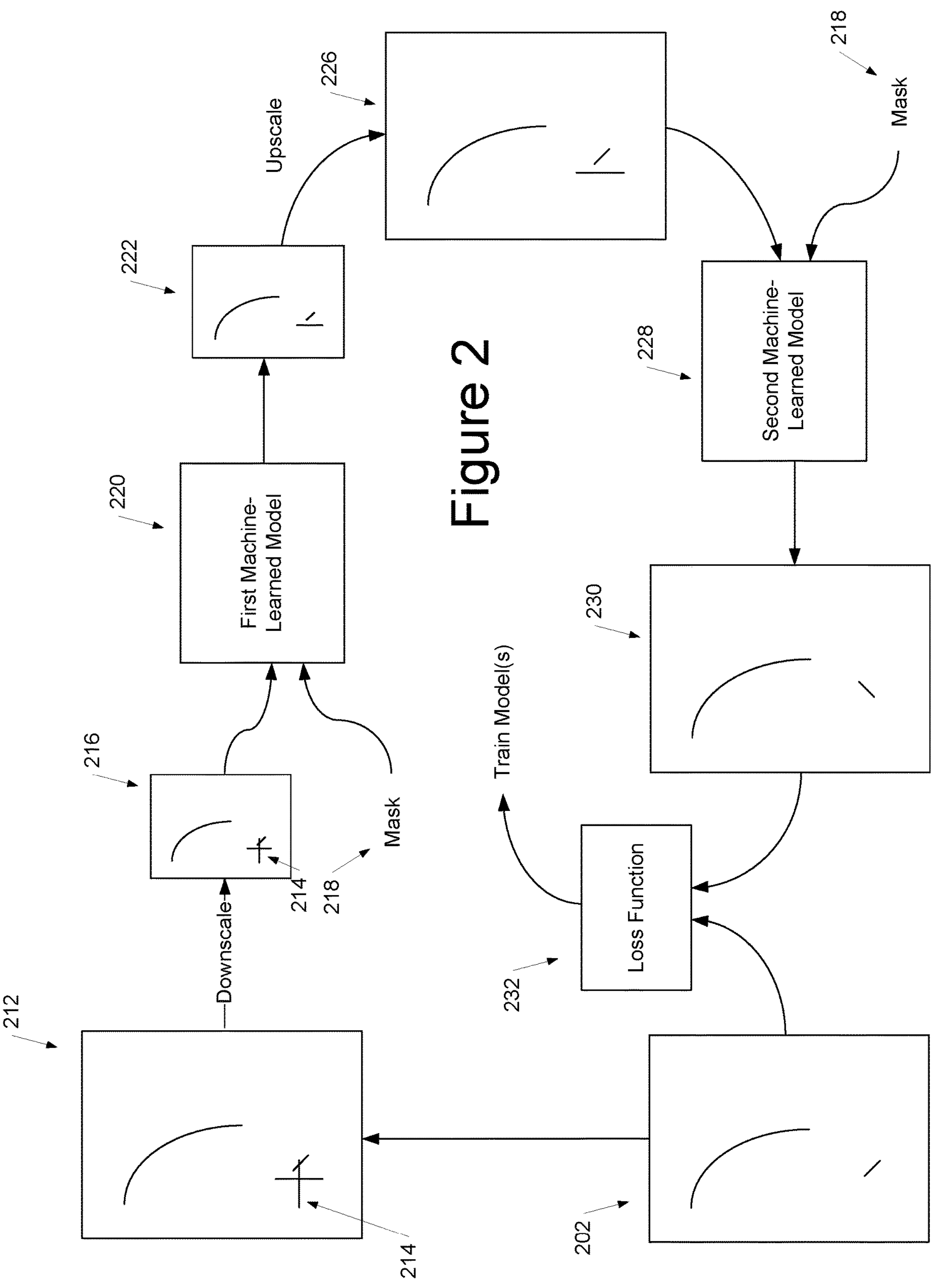
FIG. 2 depicts a block diagram of an example technique for training cascaded multi-resolution machine learning for image processing (e.g., inpainting) according to example embodiments of the present disclosure.

FIG. 2 depicts a block diagram of an example technique for training cascaded multi-resolution machine learning for image processing (e.g., inpainting) according to example embodiments of the present disclosure.

As shown in FIG. 2, a computing system can receive a lower resolution version 216 of an input image and a ground truth image 202. The lower resolution version 216 of the input image can have a first resolution and the ground truth image 202 can have a second resolution that is greater than the first resolution. The lower resolution version 216 of the input image can include one or more image elements 214 not present in the ground truth image 202 (e.g., the vertical and horizontal marks).

In some implementations, the lower resolution version 216 of the input image can be obtained by downscaling a higher resolution version 212 of the input image. In some implementations, the higher resolution version 212 of the input image can be obtained by adding the one or more image elements 214 to the ground truth image 202.

Referring still to FIG. 2, the computing system can process the lower resolution version 216 of the input image with a first machine-learned model 220 to generate a lower resolution version 222 of an augmented image having the first resolution. The lower resolution version 222 of the augmented image can include first predicted data replacing the one or more image elements 214.

In some implementations, a mask 218 can also be supplied as input to the first machine-learned model. The mask 218 can indicate the location of the image elements 214.

In some implementations, alternatively or additionally to modifying replacing the image elements, the model 220 can predict additional data about the input image such as semantic segmentation data, object detection data, object recognition data, human keypoint detection data, facial recognition data, etc.

Referring still to FIG. 2, the computing system can upscale the lower resolution version 222 of the augmented image to generate a higher resolution version 226 of the augmented image having the second resolution.

The computing system can process at least a portion of the higher resolution version 226 of the augmented image with a second machine-learned model 228 to generate a predicted image 230 having the second resolution.

The computing system can evaluate a loss function 232 that evaluates a difference between the predicted image 230 and the ground truth image 202. Example loss terms that can be included in the loss function 232 can include visual loss (e.g., pixel-level loss), VGG loss, GAN loss, and/or other loss terms.

The computing system can adjust one or more parameters of at least one of the first machine-learned model 220 or the second machine-learned model 228 based at least in part on the loss function. For example, the loss function 232 can be backpropagated through the second model 228 and then through the first model 220 to train the second model 228 and/or the first model 220.

Example Devices and Systems

Figure 3A:
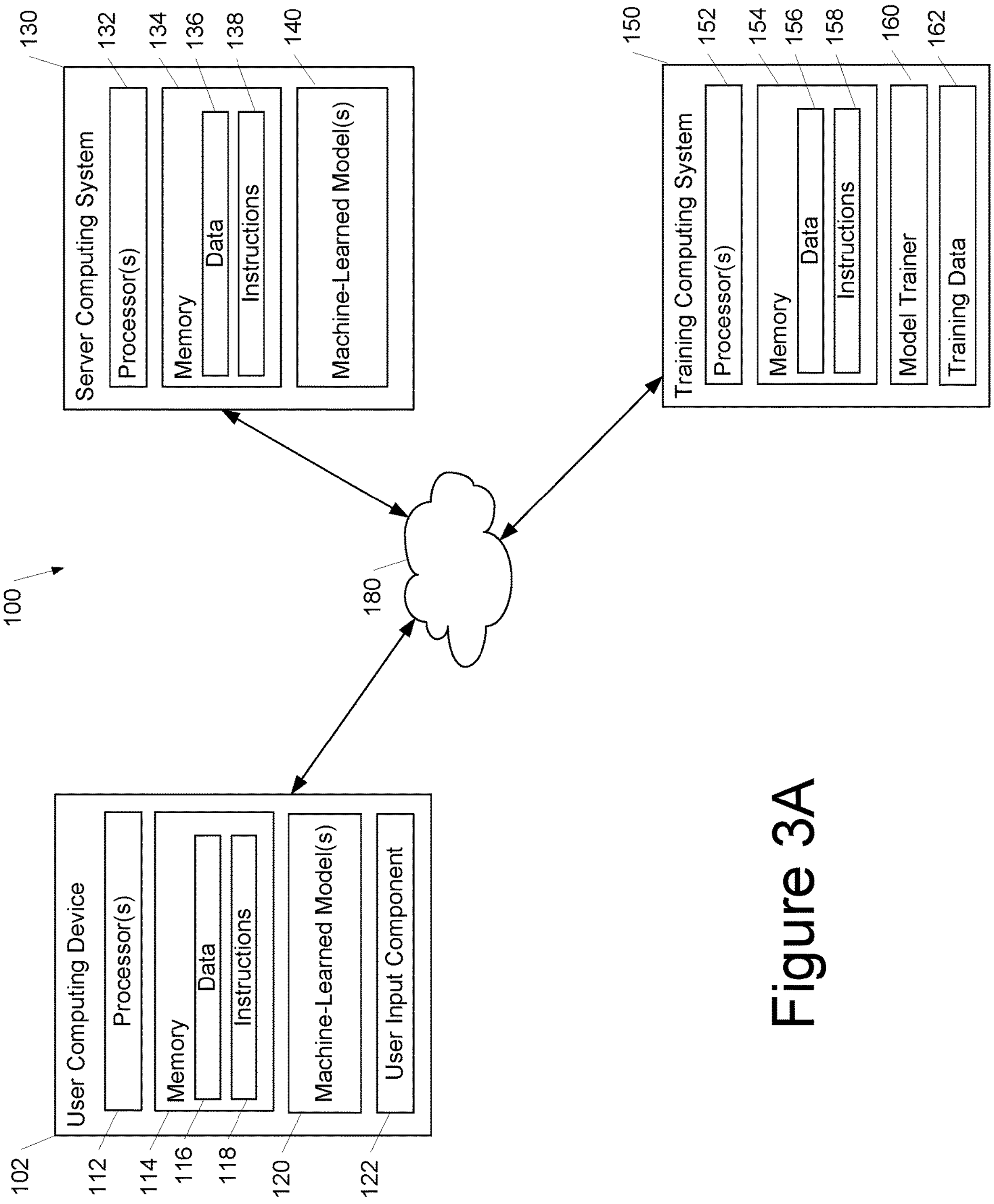
FIG. 3A depicts a block diagram of an example computing system according to example embodiments of the present disclosure.

FIG. 3A depicts a block diagram of an example computing system 100 according to example embodiments of the present disclosure. The system 100 includes a user computing device 102, a server computing system 130, and a training computing system 150 that are communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 includes one or more processors 112 and a memory 114. The one or more processors 112 can be any suitable processing device (e.g., a processor core, a microprocessor, an ASIC, an FPGA, a controller, a microcontroller, etc.) and can be one processor or a plurality of processors that are operatively connected. The memory 114 can include one or more non-transitory computer-readable storage media, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

In some implementations, the user computing device 102 can store or include one or more machine-learned models 120. For example, the machine-learned models 120) can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks. Some example machine-learned models can leverage an attention mechanism such as self-attention. For example, some example machine-learned models can include multi-headed self-attention models (e.g., transformer models). Example machine-learned models 120 are discussed with reference to FIGS. 1 and 2.

In some implementations, the one or more machine-learned models 120 can be received from the server computing system 130 over network 180, stored in the user computing device memory 114, and then used or otherwise implemented by the one or more processors 112. In some implementations, the user computing device 102 can implement multiple parallel instances of a single machine-learned model 120 (e.g., to perform parallel image processing across multiple instances of images or image elements).

Additionally or alternatively, one or more machine-learned models 140 can be included in or otherwise stored and implemented by the server computing system 130 that communicates with the user computing device 102 according to a client-server relationship. For example, the machine-learned models 140 can be implemented by the server computing system 140 as a portion of a web service (e.g., an image processing service). Thus, one or more models 120 can be stored and implemented at the user computing device 102 and/or one or more models 140 can be stored and implemented at the server computing system 130.

The user computing device 102 can also include one or more user input components 122 that receives user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 130 includes one or more processors 132 and a memory 134. The one or more processors 132 can be any suitable processing device (e.g., a processor core, a microprocessor, an ASIC, an FPGA, a controller, a microcontroller, etc.) and can be one processor or a plurality of processors that are operatively connected. The memory 134 can include one or more non-transitory computer-readable storage media, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise include one or more machine-learned models 140. For example, the models 140 can be or can otherwise include various machine-learned models. Example machine-learned models include neural networks or other multi-layer non-linear models. Example neural networks include feed forward neural networks, deep neural networks, recurrent neural networks, and convolutional neural networks. Some example machine-learned models can leverage an attention mechanism such as self-attention. For example, some example machine-learned models can include multi-headed self-attention models (e.g., transformer models). Example models 140 are discussed with reference to FIGS. 1 and 2.

The user computing device 102 and/or the server computing system 130 can train the models 120 and/or 140 via interaction with the training computing system 150 that is communicatively coupled over the network 180. The training computing system 150 can be separate from the server computing system 130 or can be a portion of the server computing system 130.

The training computing system 150 includes one or more processors 152 and a memory 154. The one or more processors 152 can be any suitable processing device (e.g., a processor core, a microprocessor, an ASIC, an FPGA, a controller, a microcontroller, etc.) and can be one processor or a plurality of processors that are operatively connected. The memory 154 can include one or more non-transitory computer-readable storage media, such as RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 includes or is otherwise implemented by one or more server computing devices.

The training computing system 150 can include a model trainer 160 that trains the machine-learned models 120 and/or 140 stored at the user computing device 102 and/or the server computing system 130 using various training or learning techniques, such as, for example, backwards propagation of errors. For example, a loss function can be back-propagated through the model(s) to update one or more parameters of the model(s) (e.g., based on a gradient of the loss function). Various loss functions can be used such as mean squared error, likelihood loss, cross entropy loss, hinge loss, and/or various other loss functions. Gradient descent techniques can be used to iteratively update the parameters over a number of training iterations.

In some implementations, performing backwards propagation of errors can include performing truncated back-propagation through time. The model trainer 160 can perform a number of generalization techniques (e.g., weight decays, dropouts, etc.) to improve the generalization capability of the models being trained.

In particular, the model trainer 160 can train the machine-learned models 120 and/or 140 based on a set of training data 162. In some implementations, if the user has provided consent, the training examples can be provided by the user computing device 102. Thus, in such implementations, the model 120 provided to the user computing device 102 can be trained by the training computing system 150 on user-specific data received from the user computing device 102. In some instances, this process can be referred to as personalizing the model.

The model trainer 160 includes computer logic utilized to provide desired functionality. The model trainer 160 can be implemented in hardware, firmware, and/or software controlling a general purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium such as RAM, hard disk, or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

In some implementations, the input to the machine-learned model(s) of the present disclosure can be image data comprising pixel data which includes a plurality of pixels. The machine-learned model(s) can process the pixel data to generate an output. As an example, the machine-learned model(s) can process the image data to generate a modified and/or enhanced image. As another example, the machine-learned model(s) can process the image data to generate an image recognition output (e.g., a recognition of the image data, a latent embedding of the image data, an encoded representation of the image data, a hash of the image data, etc.). As another example, the machine-learned model(s) can process the image data to generate an image segmentation output. As another example, the machine-learned model(s) can process the image data to generate an image classification output. As another example, the machine-learned model(s) can process the image data to generate an image data modification output (e.g., an alteration of the image data, etc.). As another example, the machine-learned model(s) can process the image data to generate an encoded image data output (e.g., an encoded and/or compressed representation of the image data, etc.). As another example, the machine-learned model(s) can process the image data to generate an upscaled image data output. As another example, the machine-learned model(s) can process the image data to generate a prediction output.

In some cases, the input includes visual data, and the task is a computer vision task. In some cases, the input includes pixel data for one or more images and the task is an image processing task. For example, the image processing task can be image classification, where the output is a set of scores, each score corresponding to a different object class and representing the likelihood that the one or more images depict an object belonging to the object class. The image processing task may be object detection, where the image processing output identifies one or more regions in the one or more images and, for each region, a likelihood that region depicts an object of interest. As another example, the image processing task can be image segmentation, where the image processing output defines, for each pixel in the one or more images, a respective likelihood for each category in a predetermined set of categories. For example, the set of categories can be foreground and background. As another example, the set of categories can be object classes. As another example, the image processing task can be depth estimation, where the image processing output defines, for each pixel in the one or more images, a respective depth value. As another example, the image processing task can be motion estimation, where the network input includes multiple images, and the image processing output defines, for each pixel of one of the input images, a motion of the scene depicted at the pixel between the images in the network input.

FIG. 3A illustrates one example computing system that can be used to implement the present disclosure. Other computing systems can be used as well. For example, in some implementations, the user computing device 102 can include the model trainer 160 and the training dataset 162. In such implementations, the models 120 can be both trained and used locally at the user computing device 102. In some of such implementations, the user computing device 102 can implement the model trainer 160 to personalize the models 120 based on user-specific data.

Figure 3B:
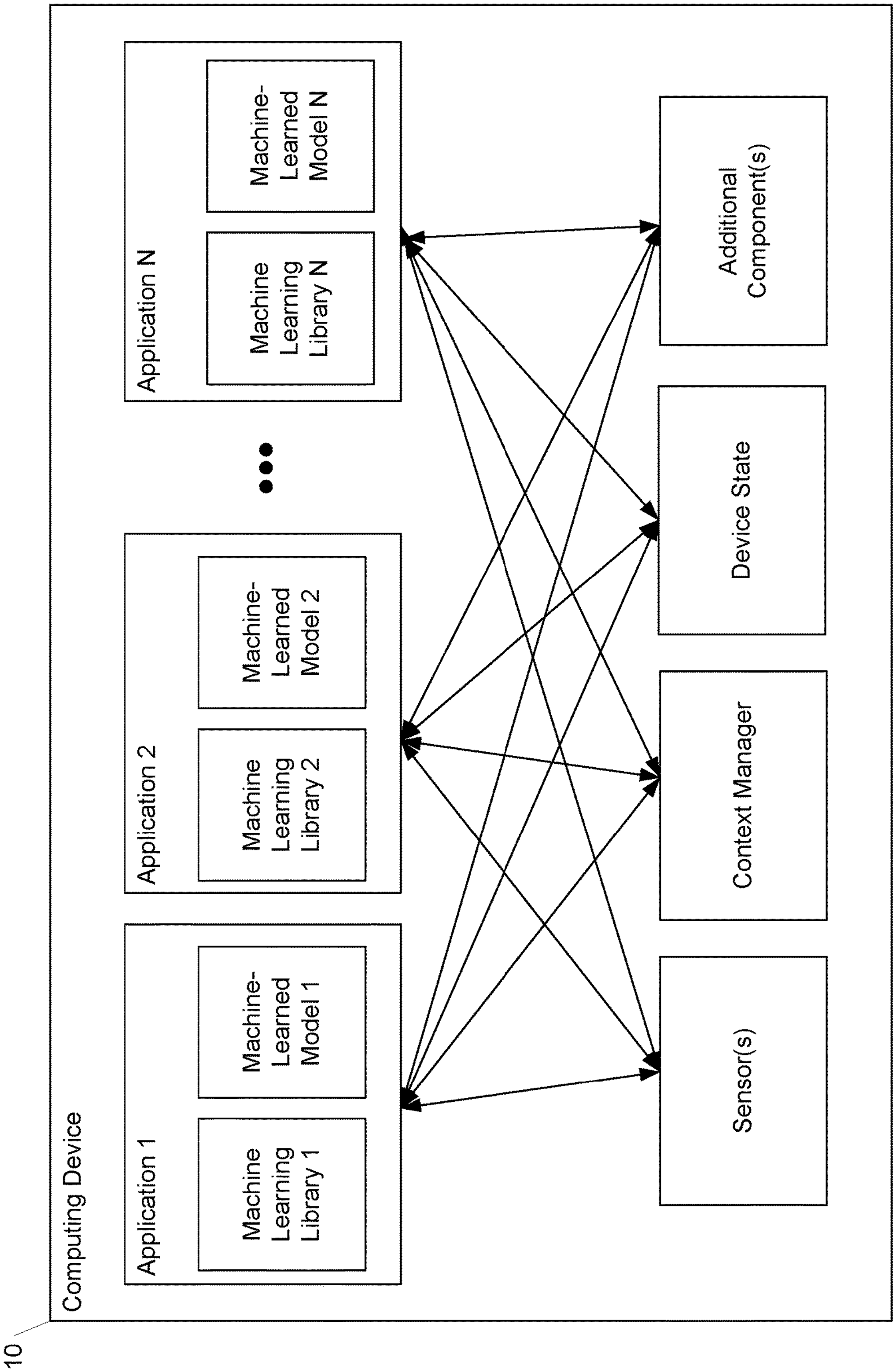
FIG. 3B depicts a block diagram of an example computing device according to example embodiments of the present disclosure.

FIG. 3B depicts a block diagram of an example computing device 10 that performs according to example embodiments of the present disclosure. The computing device 10 can be a user computing device or a server computing device.

The computing device 10 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 3B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 3C:
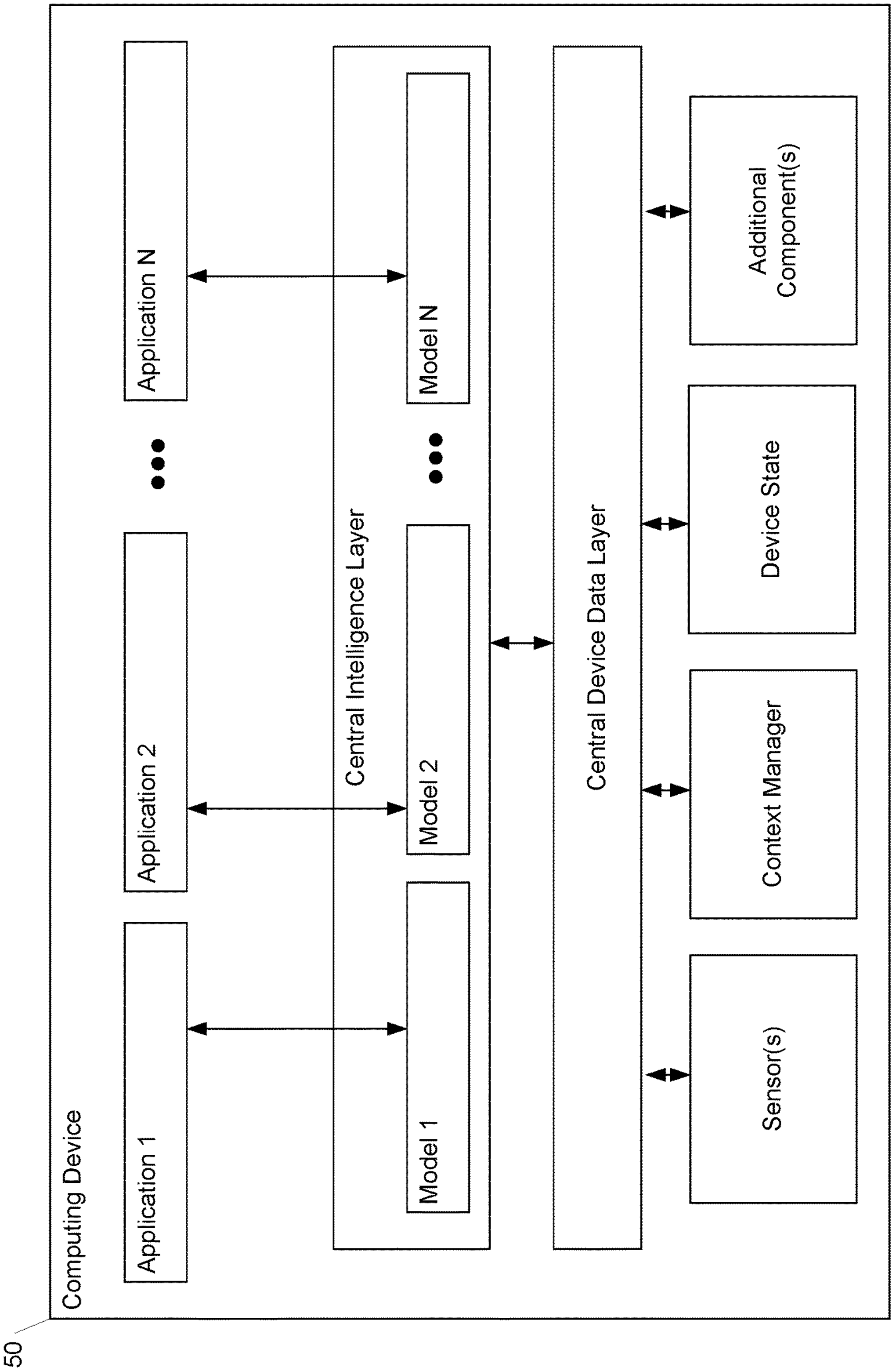
FIG. 3C depicts a block diagram of an example computing device according to example embodiments of the present disclosure.

FIG. 3C depicts a block diagram of an example computing device 50 that performs according to example embodiments of the present disclosure. The computing device 50 can be a user computing device or a server computing device.

The computing device 50 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 3C, a respective machine-learned model can be provided for each application and managed by the central intelligence layer. In other implementations, two or more applications can share a single machine-learned model. For example, in some implementations, the central intelligence layer can provide a single model for all of the applications. In some implementations, the central intelligence layer is included within or otherwise implemented by an operating system of the computing device 50.

The central intelligence layer can communicate with a central device data layer. The central device data layer can be a centralized repository of data for the computing device 50. As illustrated in FIG. 3C, the central device data layer can communicate with a number of other components of the computing device, such as, for example, one or more sensors, a context manager, a device state component, and/or additional components. In some implementations, the central device data layer can communicate with each device component using an API (e.g., a private API).

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computing system for image modification with improved computational efficiency, the computing system comprising:

one or more processors; and one or more non-transitory computer-readable media that collectively store instructions that, when executed by the one or more processors, cause the computing system to perform operations, the operations comprising:

obtaining a lower resolution version of an input image, wherein the lower resolution version of the input image has a first resolution, wherein the lower resolution version of the input image comprises one or more image elements to be modified with predicted image data;

processing the lower resolution version of the input image with a first machine-learned model to generate an augmented image having the first resolution, wherein the augmented image comprises first predicted image data replacing the one or more image elements;

extracting a portion of the augmented image, wherein the portion of the augmented image is a selected spatial crop that is less than the entire augmented image and comprises the first predicted image data;

upscaling the extracted portion of the augmented image to generate an upscaled image portion having an upscaled resolution;

processing the upscaled image portion with a second machine-learned model to generate a refined portion, wherein the refined portion comprises second predicted image data that modifies at least a portion of the first predicted image data;

generating an output image based on the refined portion and a higher resolution version of the input image, wherein both the output image and the higher resolution version of the input image have a second resolution that is greater than the first resolution; and providing the output image as an output.

2. The computing system of claim 1, wherein obtaining the lower resolution version of the input image comprises downscaling the higher resolution version of the input image to obtain the lower resolution version of the input image.

3. The computing system of claim 1, wherein: processing the lower resolution version of the input image with the first machine-learned model to generate the augmented image comprises processing the lower resolution version of the input image and a mask that identifies the one or more image elements with a first machine-learned inpainting model to generate the augmented image having first inpainted image data that modifies the one or more image elements; and processing the upscaled image portion with the second machine-learned model to generate the refined portion comprises processing the upscaled image portion with a second machine-learned inpainting model to generate the refined portion having second inpainted image data that modifies at least a portion of the first inpainted image data.

4. The computing system of claim 1, wherein upscaling the extracted portion of the augmented image to generate the upscaled image portion having the upscaled resolution comprises upscaling the extracted portion of the augmented image such that the upscaled resolution matches a corresponding resolution of a corresponding portion of the higher resolution version of the input image, wherein the corresponding portion proportionally corresponds to the extracted portion of the augmented image.

5. The computing system of claim 1, wherein generating the output image based on the refined portion and the higher resolution version of the input image comprises inserting the refined portion into the higher resolution version of the input image.

6. The computing system of claim 1, wherein the one or more image elements to be replaced comprise one or more user-designated image elements that have been designated based on one or more user inputs.

7. The computing system of claim 1, wherein the one or more image elements to be replaced are one or more computer-designated image elements, wherein the one or more computer-designated image elements are designated by processing the input image with one or more classification sub-blocks of at least one of the first machine-learned model or the second machine-learned model.

8. The computing system of claim 1, wherein the first and the second predicted image data correspond to one or more of inpainting, deblurring, recoloring, or smoothing of the one or more image elements.

9. The computing system of claim 1, wherein: the one or more objects comprises a plurality of objects;

said processing the lower resolution version of the input image with the first machine-learned model to generate the augmented image is performed once; and said extracting, upscaling, and processing the upscaled image portion with the second machine-learned model are performed separately for each object of the plurality of objects.

10. The computing system of claim 1, further comprising passing one or more internal feature vectors from the first machine-learned model to the second machine-learned model.

11. The computing system of claim 1, wherein the augmented image further comprises a predicted depth channel output by the first machine-learned model.

12. A computer-implemented method for training machine learning models to perform image modification, the method comprising:

receiving, by a computing system comprising one or more processors, a lower resolution version of an input image and a ground truth image, wherein the lower resolution version of the input image has a first resolution and the ground truth image has a second resolution that is greater than the first resolution, and wherein the lower resolution version of the input image comprises one or more image elements not present in the ground truth image;

processing, by the computing system, the lower resolution version of the input image with a first machine-learned model to generate a lower resolution version of an augmented image having the first resolution, wherein the lower resolution version of the augmented image comprises first predicted data replacing the one or more image elements;

upscaling, by the computing system, the lower resolution version of the augmented image to generate a higher resolution version of the augmented image having the second resolution;

processing, by the computing system, at least a portion of the higher resolution version of the augmented image with a second machine-learned model to generate a predicted image having the second resolution;

evaluating, by the computing system, a loss function that evaluates a difference between the predicted image and the ground truth image; and adjusting one or more parameters of at least one of the first machine-learned model or the second machine-learned model based at least in part on the loss function.

13. The computer-implemented method of claim 12, wherein the one or more image elements are one or more user-designated image elements, wherein the one or more user-designated image elements are designated based on the one or more user inputs.

14. The computer-implemented method of claim 12, wherein the one or more image elements are one or more computer-designated image elements, wherein the one or more computer-designated image elements are designated by processing the input image with one or more classification sub-blocks of at least one of the first machine-learned model or the second machine-learned model.

15. The computer-implemented method of claim 12, wherein the predicted image corresponds to at least one of inpainting, deblurring, recoloring, or smoothing of the one or more image elements.

16. One or more non-transitory computer readable media that collectively store instructions that, when executed by one or more processors, cause a computing system to perform operations, the operations comprising:

obtaining a lower resolution version of an input image, wherein the lower resolution version of the input image has a first resolution;

processing the lower resolution version of the input image with a first machine-learned model to generate a first predicted image having the first resolution, wherein the first predicted image comprises first predicted image data;

extracting a portion of the first predicted image, wherein the portion of the first predicted image is a selected spatial crop that is less than the entire first predicted image and comprises the first predicted image data;

upscaling the extracted portion of the first predicted image to generate an upscaled image portion having an upscaled resolution; and processing the upscaled image portion with a second machine-learned model to generate a second predicted image, wherein the second predicted image comprises second predicted image data that modifies at least a portion of the first predicted image data.

17. The one or more non-transitory computer readable media of claim 16, wherein the first predicted image and the second predicted image comprise edge recognition images that indicate recognized edges in the input image.

18. The one or more non-transitory computer readable media of claim 16, wherein the first predicted image and the second predicted image comprise object detection images that indicate objects detected in the input image.

19. The one or more non-transitory computer readable media of claim 16, wherein the first predicted image and the second predicted image comprise human keypoint estimation images that indicate human keypoints detected in the input image.

20. The one or more non-transitory computer readable media of claim 16, wherein the first predicted image and the second predicted image comprise face recognition images that indicate recognized faces in the input image.

* * * * *